May 22, 1956     R. S. ESTEY     2,746,352
OPTICAL INDICATING DEVICE
Filed Jan. 16, 1952     2 Sheets-Sheet 1
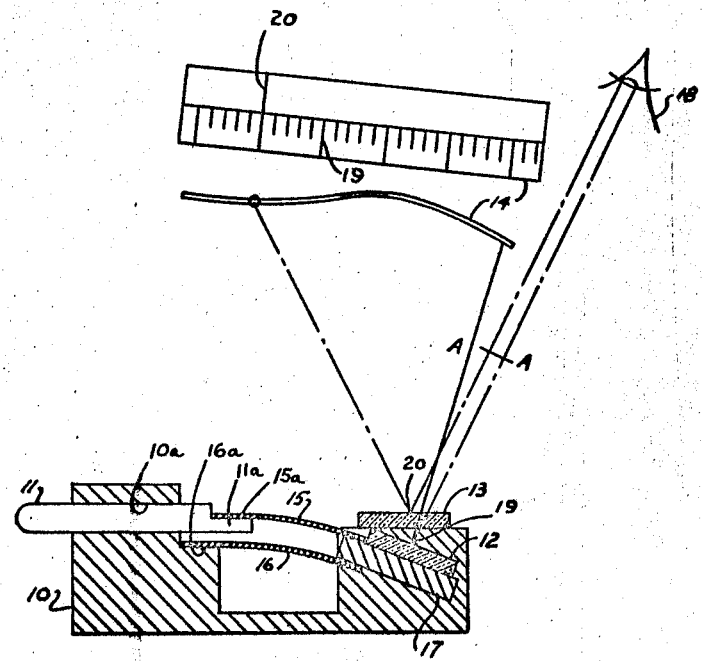
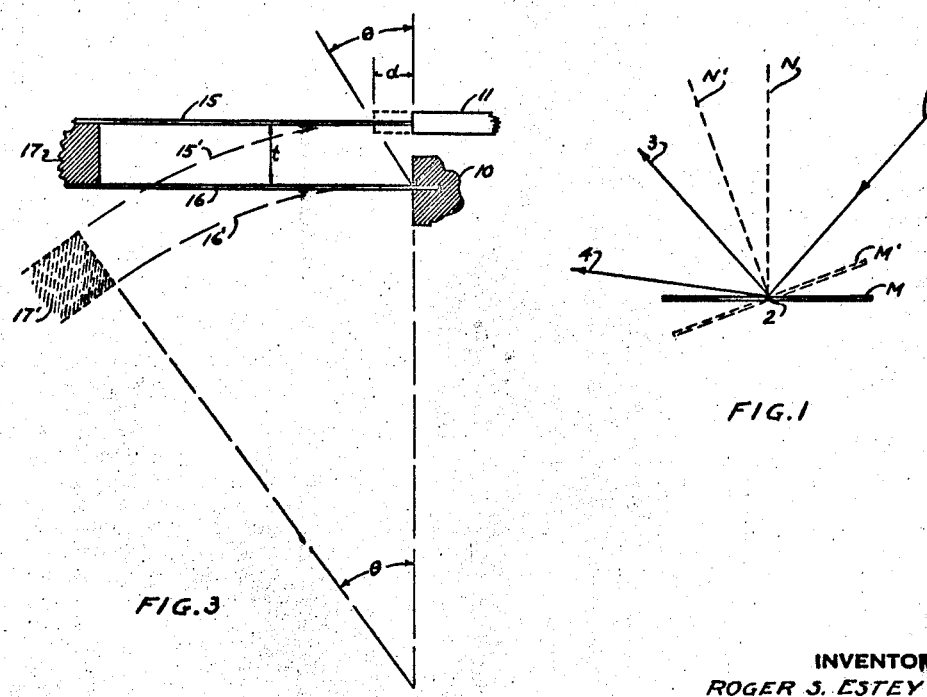
FIG. 2
FIG. 3
FIG. 1
INVENTOR
ROGER S. ESTEY
BY
ATTORNEY

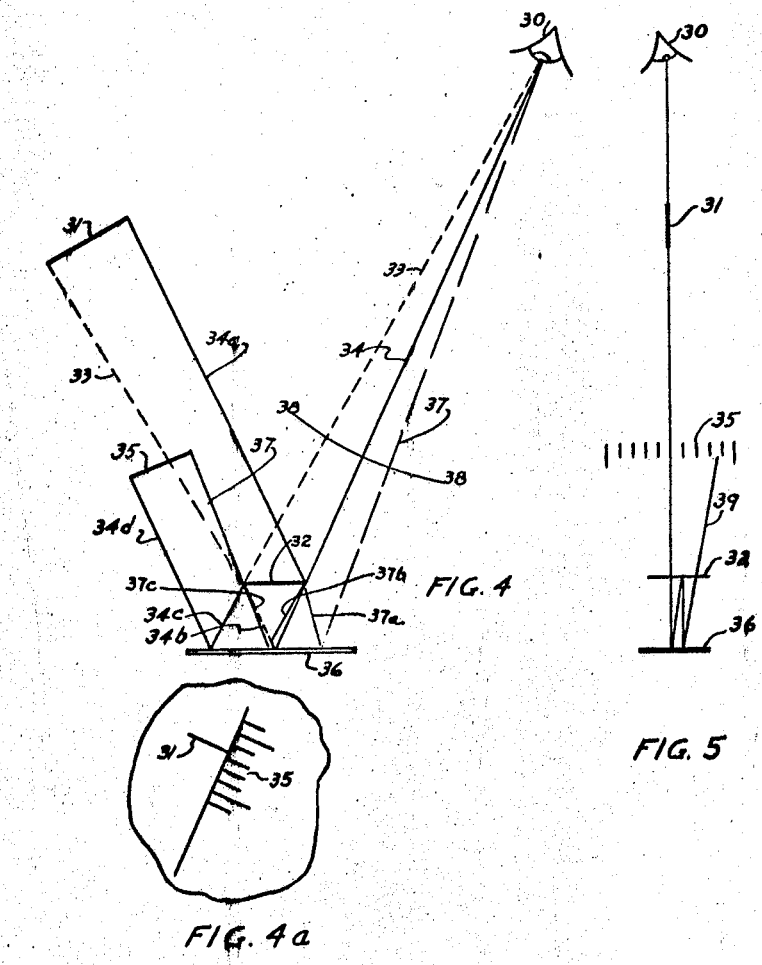

United States Patent Office 2,746,352
Patented May 22, 1956

2,746,352

OPTICAL INDICATING DEVICE

Roger S. Estey, China Lake, Calif.

Application January 16, 1952, Serial No. 266,672

5 Claims. (Cl. 88—74)

This invention relates to optical indicating devices and has particular reference to a new and improved form of such device which utilizes the optical lever principle and with which the use of collimators, projectors and telescopes is not usually necessary and which, therefore, provides a relatively simple, compact and inexpensive device for measuring small changes in angle.

An object of the invention is to provide a relatively simple, compact and inexpensive optical indicating device.

Another object is to provide a device of the type set forth which utilizes the optical lever principle.

Another object of the invention is to provide a device of the type set forth with which it is possible to obtain a multiplication of the reading.

Another object of the invention is to provide a simple, rugged and relatively inexpensive or economical micrometric indicator for use in making fine measurements in machine shops and the like.

Other objects and advantages of the invention will be apparent from the following description taken in connection with the accompanying drawings. It will be understood that changes may be made in the details of construction and arrangement of parts in the device shown embodying the invention without departing from the scope of the invention as set forth in the accompanying claims.

Referring to the drawings:

Fig. 1 is a diagrammatic view illustrating the principle utilized in the invention;

Fig. 2 is a side elevation, partly in section, of one form of a micrometric indicator embodying the invention;

Fig. 3 is a diagrammatic view illustrating the operation of the device;

Fig. 4 is a diagrammatic elevational view of another form of the invention;

Fig. 4a is a fragmentary plan view of a portion of the arrangement shown in Fig. 4; and Fig. 5 is a further view of the arrangement of Fig. 4 but taken in the plane perpendicular to that of Fig. 4.

As previously stated, the present invention relates to optical indicating devices utilizing the optical lever principle. This principle, which is well known in the art, utilizes the property of a rotatable plane mirror to turn a reflected ray of light through twice the angle of the mirror rotation. This principle is illustrated in Fig. 1 wherein the line 1—2 represents a ray of light incident on the mirror M. The normal to the mirror is shown at 2—N and the reflected ray is 2—3. In accordance with the well known law of reflection, angle 1—2—N is equal to angle N—2—3. Now as the mirror M is rotated to the position indicated by M', as shown in dotted lines in Fig. 1, the reflected ray is 2—4 and the increase in deflection is angle 3—2—4 which is just twice the angle of mirror rotation N—2—N'.

Prior art devices for the same purpose as the device of the present invention identified the incident and emergent rays by means of collimators of varying degrees of complexity ranging from simple projectors used with translucent scales to telescope and scale combinations and autocollimators.

In the present invention, I utilize a simple auxiliary optical element, namely a fixed mirror or reflector whereby the eye of the observer, cooperating with the geometry of the device embodying the invention serves to identify the lines of sight without additional apparatus and this permits angular and linear quantities to be measured with high precision and hitherto unknown simplicity.

Specifically, whatever the eye position may be, the reflection of the ray in the fixed mirror is observed and compared with the reflection of the corresponding ray in the rotatable mirror. When the latter mirror is rotated the reflection of the first mentioned ray in the fixed mirror is unchanged and serves to establish a new comparison with the new value of deviation of that ray reflected in the deviated position of the movable mirror.

While the present invention may be employed in a large number of devices, it has been shown for the purpose of illustration, embodied in a micrometric indicator of the type commonly known as a "lathe indicator," adapted for use in the set up of work in lathes, milling machines and the like.

As will be seen by reference to Fig. 2, the micrometric indicator comprises a base 10 carrying the plunger 11, the movable mirror 12, the fixed mirror 13 and the scale 14. The plunger 11 is mounted for sliding movement without friction and without side play in a nicely fitted hole 10a in base 10. A leaf spring 15 has one end 15a connected to the adjacent end 11a of plunger 11 and a second leaf spring 16 which is parallel to leaf spring 15 is secured at 16a to a shoulder on base 10 and the outer or free ends of the two leaf springs 15 and 16 are joined or connected to each other by means of the block 17 which has a portion extending between said springs and said block 17 carries or supports mirror or reflector 12.

On base 10 in adjacent relation with the normal position of reflector or mirror 12 is provided a fixed reflector or mirror 13.

It will be seen that any movement of plunger 11 in its bore 10a will effect angular movement of leaf springs 15 and 16 and mirror or reflector 12 relative to stationary mirror or reflector 13.

The differential action of the two springs 15 and 16 translates a lateral movement originating in one end of one spring into a rotation (and translation) of the mirror 12 in the following manner as shown in Fig. 3 on an enlarged scale. In Fig. 3 the normal or undeflected position of the springs is shown in full lines and indicated by the numbers 15 and 16 and the deflected position of the springs is shown in broken lines and indicated by 15' and 16' and the block 17 is shown in such adjusted position in broken lines and indicated by 17'.

If, as shown in Fig. 3, the spacing between the springs is denoted by $t$, and the movement of plunger 11 by $d$ and if it is assumed that the spring deflections are circular, then it is evident from the diagram that $\theta = d/t$, where $\theta$ denotes the angular deflection of the mirror 12 and the block 17. It is advantageous to use a small value of $t$ in order to create a large angular movement of mirror 12, responsive to the linear movement of plunger 11.

The scale 14 which has been shown in both side and top views in Fig. 2, with the side view being in its normal position and the top view being shown merely to facilitate the explanation of the device, is rigidly located to base 10 by any suitable or convenient means. It is pointed out that it is advantageous to utilize a large distance or separation between scale 14 and mirrors or reflectors 12 and 13 in order to create a large linear magnification of the scale reading with respect to the angular movement of mirror 12.

The scale 14 may be composed of opaque indications or marks on a transparent background or the reverse thereof.

It is essential that scale 14 be so disposed that the observer's eye 18, located at some point such as is indicated in Fig. 2, will see portions of the scale 14 and fiducial mark reflected in each of the mirrors 12 and 13. The two portions are indicated by the numbers 19 and 20. Each scale portion may be complete like 19 or preferably one scale portion may comprise a simple fiducial mark, as 20. With the eye 18 in any appropriate position, and with the mirror 12 in any position within its range, the eye of the observer will see a virtual image of the fiducial mark 20 reflected in the mirror 13 and a virtual image of a series of scale marks reflected in mirror 12. These images will be contiguous and the virtual image of the fiducial mark will serve to identify a reading of the virtual image of the scale exactly as though a real fiducial mark were contiguous with and slideably or adjustably related to a real scale. Just so long as the eye 18 retains the appropriate parts of the scale image in view, the readings will be correct because the use of two adjoining and angular mirrors 12 and 13 ensures that the fiducial mark 20 of the scale element 19 will be viewed under comparable conditions not influenced by the exact position of the eye 18.

As is common to all precise observations of juxtaposed fiducial marks and scales, precautions must be taken to avoid parallax.

In my invention parallax can be avoided as follows. A reference plane is first established in the line of sight between the mirrors 12 and 13 and the eye 18. Such a plane is represented by the line A—A of Fig. 2. The contour of the scale 14 is so adjusted that corresponding to any position of mirror 12, the distance along the indicated ray path from the scale 14 to the mirror 12 and thence to the reference plane A—A shall be equal to the reference distance from the fiducial mark 20 to the mirror 13 and thence to the reference plane A—A. It is appreciated that this correction for parallax is not precise, depending to some extent on the position of the eye 18. Nevertheless, within practical accuracy, it is a worthwhile correction in some cases.

As a micrometric indicator my invention is most useful in detecting small departures from a standard measurement and is most accurate over a short range of scale divisions. If $d$, $t$, and $\theta$ have the meanings previously assigned, and if $R$ is the distance from the mirrors to the scale, then the magnification of the device is calculated as follows.

Mirror system $$\theta = d/t$$

Optical lever: Since the light turns through twice the mirror angle, namely $2\theta$, $$\theta = s/2R$$

Hence $$d/t = s/2R$$

and magnification, $M$ is $$M = s/d = 2R/t$$

In a practical embodiment of my invention it is entirely feasible to let $R=2.0$ and $t=0.03$ inch, indicating that a magnification of 150× is readily obtainable.

It is not intended to limit my invention to the above example in which linear motion is translated to a magnified angular motion by differential springs. Any suitable mechanical movement such as a lever system or rack and pinion would serve as well.

In Figs. 4, 4a and 5 there is illustrated diagrammatically a somewhat more complicated, but superior form of my invention. In connection with this form one pencil of rays is identified as the "reference" pencil and the other as the "measuring" pencil. The reference pencil is controlled in the manner previously described. The measuring pencil, however, is controlled by a plurality of reflections in the movable or adjustable mirror.

In Fig. 4 there is shown the disposition of the mirror and the light paths representative of this example by means of an elevation in cross section, the cutting plane being that containing the rays and the normals to the mirrors while Fig. 5 is in elevation in a plane perpendicular to Fig. 4. The means for rotating the measuring mirror are not shown because such means have been adequately described above in connection with the form of the device shown in Fig. 2.

With reference to Fig. 4 the eye 30 sees the virtual image of the fiducial mark 31 reflected in the reference mirror 32. The reference pencil is bounded by the short dash line 33 and the full line 34 and its extension 34a. The virtual image is further indicated in Fig. 4a which represents the significant portion of the field of view as seen from the eye point 30, The eye 30 sees the virtual image of the scale 35 by successive reflections in the measuring mirror 36, the under side 32 (which is also a mirror) and the measuring mirror 36 (used a second time). In the view shown in Fig. 4 the traces of the two mirrors in the plane of the diagram are parallel. In this particular example used to illustrate the invention, the mirror 32 must be thin and have sharp edges to permit the close juxtaposition of the virtual image of the fiducial mark 31 and the scale 35. The measuring pencil of rays is bounded by the full line 34, its extensions 34b, 34c and 34d and the long dash line 37 with its extensions 37a, 37b and 37c.

In order to avoid parallax the distance from the reference surface 38—38 to the scale 35 via multiple reflections at the mirrors 32 and 36 is made equal to the distance from the reference surface 38—38 to the fiducial mark 31 via the mirror 32.

In Fig. 5, the measuring mirror is shown tilted clockwise. The angular deviation of the ray 39 (which is also identified by the symbols 37 and 34d in Fig. 4) is precisely four times the angular rotation of the mirror 36 from its reference position parallel to mirror 32, that is, mirror 36 rotates with the respect to the remainder of the optical system and in so doing the ray multiply reflected in the rotated and fixed mirrors turns through four times the angle of the mirror rotation.

By a slight change in the technique of using this multi-mirror optical indicator it is possible to obtain an angular scale reading which is not two or four but six times the angular rotation of the rotatable mirror. This additional magnification is obtained by interchanging the roles of mirrors 32 and 36. In this form of my invention I choose to fasten mirror 36 rigidly with respect to the frame of the device, the fiducial mark 31 and the scale 35. The two-faced mirror 32 is arranged to rotate and to permit its rotation to be measured. The magnification of six is obtained by the combination of the double deflection of the image of mark 31 and the quadruple deflection of the image of scale 35.

In the cases illustrated in Figs. 4, 4a and 5, and described above it may be advantageous to supplement the unaided eye with an appropriate type of telescopic auxiliary optical system.

The use and operation of the device embodying the invention is believed apparent from the foregoing description.

From the foregoing, it will be seen that I have provided relatively simple, efficient and economical means for obtaining all of the objects and advantages of the invention.

I claim:

1. An optical indicating device including a first opaque mirror and a fiducial mark optically aligned therewith, a second opaque mirror and a scale optically aligned therewith, said mirrors being in substantially the same plane and adapted to reflect images in the same general direction, said first mirror and fiducial mark and said second mirror and scale being in adjacent relation whereby from a common eye point the fiducial mark image is visible in said first mirror and the scale image is visible in said second mirror and the images of said scale and fiducial mark are contiguous, one of said mirrors being adjustable relative to the other of said mirrors to produce relative displacement of the images of said scale and fiducial mark, a support having a bore, a plunger in said bore, a pair of springs supporting said movable mirror, said springs being supported by said plunger and support respectively.

2. An optical indicating device including a first opaque mirror and a fiducial mark optically aligned therewith, a second opaque mirror and a scale optically aligned therewith, said mirrors being in substantially the same plane and adapted to reflect images in the same general direction, said first mirror and fiducial mark and said second mirror and scale being in adjacent relation whereby from a common eye point the fiducial mark image is visible in said first mirror and the scale image is visible in said second mirror and the images of said scale and fiducial mark are contiguous, one of said mirrors being displaceable relative to the other of said mirrors to produce relative displacement of the images of said scale and fiducial mark, a support having a bore, a plunger in said bore, a pair of parallel springs supporting said movable mirror, said parallel springs being supported by said plunger and support respectively.

3. In an optical indicating device including a fixed mirror and a movable mirror, a scale visible in each of said mirrors from a common eye point, a support for said movable mirror comprising two normally parallel flexible support elements rigidly secured at one end to said movable mirror, one of said flexible elements being secured at its other end to a stationary base and the other of said flexible elements being secured to a plunger element slidable in the direction of parallelism of said flexible elements, whereby movement of the plunger will produce relative apparent displacement of said scale as seen in said movable mirror with respect to said scale seen in said fixed mirror by tilting said movable mirror.

4. An optical indicating device including a stationary first mirror, a tiltable second mirror, said mirrors being substantially in the same plane and adapted to reflect images in the same general direction toward a common eye point, an elongated scale visible in said mirrors from said common eye point, comprising two parallel portions lying along its length, said scale being so located with respect to said first and second mirrors that one parallel portion including a fiducial mark is reflected in the first mirror to said eye point, and the other parallel scale portion is reflected in said second mirror to said eye point, a support having a bore, a plunger slidable in said bore, means actuated by said plunger to tilt said second mirror in proportion to the amount of movement of the plunger in a direction to apparently move the reflected image of said other scale portion longitudinally with respect to said portion including the fiducial mark whereby the movement of said plunger in said bore may be measured.

5. An optical indicating device including a stationary first mirror and a tiltable second mirror, said mirrors being in substantially the same plane and adapted to reflect images in the same general direction to a common eye point, an elongated scale visible in both said mirrors from said common eye point, a support having a bore, a plunger axially slidable in said bore, means actuated by said plunger to tilt said second mirror in proportion to the movement of the plunger and in a direction to apparently move the reflected image of said scale in said second mirror with respect to said scale reflected in said first mirror whereby the movement of said plunger in said bore may be measured.

References Cited in the file of this patent

UNITED STATES PATENTS

| | | |
|---|---|---|
| 2,205,517 | Devol | June 25, 1940 |
| 2,232,177 | Ide | Feb. 18, 1941 |
| 2,347,702 | Maris | May 2, 1944 |
| 2,569,579 | Rinker | Oct. 2, 1951 |

FOREIGN PATENTS

| | | |
|---|---|---|
| 699,171 | France | Dec. 8, 1930 |